US011429679B1

(12) United States Patent
Bourne et al.

(10) Patent No.: US 11,429,679 B1
(45) Date of Patent: Aug. 30, 2022

(54) SYSTEM AND METHOD FOR AUGMENTING ELEMENT RECORDS ASSOCIATED WITH THE ELEMENTS OF A DISTRIBUTED COMPUTING ENVIRONMENT WITH USER-DEFINED CONTENT

(71) Applicant: VCE Company, LLC, Richardson, TX (US)

(72) Inventors: Geoffrey D. Bourne, Allen, TX (US); Arthur O. Beall, III, Sachse, TX (US)

(73) Assignee: EMC IP Holding Company LLC, Round Rock, TX (US)

( * ) Notice: Subject to any disclaimer, the term of this patent is extended or adjusted under 35 U.S.C. 154(b) by 540 days.

(21) Appl. No.: 14/802,785

(22) Filed: Jul. 17, 2015

(51) Int. Cl.
*G06F 16/951* (2019.01)
*G06F 3/04842* (2022.01)
*G06F 16/2455* (2019.01)
*G06F 16/432* (2019.01)

(52) U.S. Cl.
CPC ........ *G06F 16/951* (2019.01); *G06F 3/04842* (2013.01); *G06F 16/24566* (2019.01); *G06F 16/434* (2019.01)

(58) Field of Classification Search
CPC ........... G06F 17/30864; G06F 3/04842; G06F 16/951; G06F 16/24566; G06F 16/434
USPC ....................................................... 707/706
See application file for complete search history.

(56) References Cited

U.S. PATENT DOCUMENTS

| | | | |
|---|---|---|---|
| 7,590,620 B1* | 9/2009 | Pike ..................... | G06F 16/285 |
| 8,332,386 B2* | 12/2012 | Olkin ................ | G06F 16/24566 |
| | | | 707/715 |
| 8,417,727 B2* | 4/2013 | Slezak .................. | G06F 16/284 |
| | | | 707/792 |
| 8,521,748 B2* | 8/2013 | Slezak .................. | G06F 16/283 |
| | | | 707/741 |
| 9,007,465 B1* | 4/2015 | Fontanez ............. | G06Q 30/016 |
| | | | 348/207.1 |
| 9,208,174 B1* | 12/2015 | Ballagh ................. | G06F 16/532 |
| 2002/0188700 A1* | 12/2002 | Steitle ................... | H04L 41/024 |
| | | | 709/220 |
| 2003/0191829 A1* | 10/2003 | Masters ................. | G06F 9/505 |
| | | | 709/225 |
| 2004/0215612 A1* | 10/2004 | Brody ................... | G06F 16/951 |
| 2005/0268220 A1* | 12/2005 | Tanaka .................. | G06F 40/169 |
| | | | 715/232 |
| 2008/0098339 A1* | 4/2008 | Chan .............. | G01R 31/318314 |
| | | | 716/108 |
| 2008/0140623 A1* | 6/2008 | Tien ..................... | G06F 16/3325 |
| 2008/0215543 A1* | 9/2008 | Huang ................ | G06F 16/9535 |
| 2009/0043799 A1* | 2/2009 | Morris ..................... | G06F 9/453 |

(Continued)

*Primary Examiner* — Ashish Thomas
*Assistant Examiner* — Nargis Sultana
(74) *Attorney, Agent, or Firm* — Polsinelli PC; Derek D. Donahoe

(57) ABSTRACT

A distributed computing environment data store management system includes a computer-based system for identifying a subset of element records in a data store associated with the elements of a distributed computing environment, receiving at least one user-defined data element from a user interface. Using the user-defined data element, the system adds the user-defined data element to each of the subset of element records, and stores each of the subset of element records and their associated user-defined data in the database.

14 Claims, 9 Drawing Sheets

(56) References Cited

U.S. PATENT DOCUMENTS

| | | | |
|---|---|---|---|
| 2009/0112683 A1* | 4/2009 | Hamilton, II | G06Q 30/0203 705/7.32 |
| 2009/0182756 A1* | 7/2009 | Kang | G06F 16/217 |
| 2009/0327391 A1* | 12/2009 | Park | H04W 8/005 709/201 |
| 2012/0035961 A1* | 2/2012 | Dvorak | G16H 40/20 705/3 |
| 2012/0254045 A1* | 10/2012 | Orfano | G06Q 40/02 705/306 |
| 2013/0346425 A1* | 12/2013 | Bruestle | G06F 7/36 707/752 |
| 2014/0101124 A1* | 4/2014 | Scriffignano | G06F 16/951 707/706 |
| 2014/0269555 A1* | 9/2014 | Sadasivam | H04W 4/80 370/329 |
| 2014/0344264 A1* | 11/2014 | Kenna | G06F 16/90328 707/731 |
| 2014/0348396 A1* | 11/2014 | Laaser | G06K 9/00442 382/113 |
| 2015/0088898 A1* | 3/2015 | Branch | G06F 16/24561 707/756 |
| 2015/0100578 A1* | 4/2015 | Rosen | G16H 30/40 707/737 |
| 2015/0149611 A1* | 5/2015 | Lissack | H04L 41/22 709/224 |
| 2015/0186455 A1* | 7/2015 | Horling | G06F 16/31 707/722 |
| 2015/0363498 A1* | 12/2015 | Brown | G06F 16/134 707/722 |
| 2016/0012136 A1* | 1/2016 | Ben Zvi | G06F 16/9537 707/770 |
| 2016/0092569 A1* | 3/2016 | Nadgir | G06F 16/24575 707/722 |
| 2016/0196350 A1* | 7/2016 | Mau | G06F 16/951 707/706 |
| 2016/0335701 A1* | 11/2016 | Allen | G06Q 30/0619 |
| 2017/0099185 A1* | 4/2017 | Reus | H04L 67/306 |
| 2017/0235795 A1* | 8/2017 | Gilder | G06F 16/24566 707/754 |
| 2017/0364376 A1* | 12/2017 | Jacob | G06F 9/44505 |

* cited by examiner

SYSTEM AND METHOD FOR AUGMENTING ELEMENT RECORDS ASSOCIATED WITH THE ELEMENTS OF A DISTRIBUTED COMPUTING ENVIRONMENT WITH USER-DEFINED CONTENT

TECHNICAL FIELD

Aspects of the present disclosure relate to computing devices and, in particular, to a system and method for augmenting element records associated with the elements of a distributed computing environment with user-defined content.

BACKGROUND

Computing environments used by enterprises, such as corporations and universities, are often provided by multiple computing devices that function in a collaborative manner to meet the computing resource needs of the enterprise. With the advent of the cloud and increased needs for stable computing environments, computing environments, such as virtual computing environments, were introduced and that provide a standardized package of components combined into a single, optimized computing solution. These virtual computing environments typically offer a relatively high level of customization for applications by distributing the workload of applications over multiple resources while alleviating the need to manage specific physical requirements of the underlying physical structure on which the resources are executed.

SUMMARY

According to one aspect of the present disclosure, a distributed computing environment data store management system includes a computer-based system for identifying a subset of element records in a data store associated with the elements of a distributed computing environment, receiving at least one user-defined data element from a user interface. Using the user-defined data element, the system adds the user-defined data element to each of the subset of element records, and stores each of the subset of element records and their associated user-defined data in the database.

BRIEF DESCRIPTION OF THE DRAWINGS

The various features and advantages of the technology of the present disclosure will be apparent from the following description of particular embodiments of those technologies, as illustrated in the accompanying drawings. In the drawings the like reference characters may refer to the same parts throughout the different views. The drawings depict only typical embodiments of the present disclosure and, therefore, are not to be considered limiting in scope.

DETAILED DESCRIPTION

Embodiments of the present disclosure provide a system and method for augmenting records associated with the elements of a distributed computing environment with user-defined content. Traditional techniques for associating user-defined content with records of a data store have often requires the use of an additional, separate data store that uses application-side joining between the data store used to store records associated with the elements and the data store used to store the user-defined content. Nevertheless, these techniques were difficult to implement and maintain given the relatively large numbers of elements of a distributed computing environment that often change on a relatively frequent basis. Embodiments of the present disclosure provide a solution to this problem by providing a data store management system for a distributed computing environment that augments existing records of a data store with user-defined content such that the user-defined content becomes part of the existing records. Additionally, the augmented user-defined content is searchable such that searches for certain records in the data store may be conducted against the augmented user-defined content such that search capabilities may be enhanced.

Distributed computing environments have provided an efficient platform for the execution of relatively large and complex applications and/or services requiring a relatively high level of availability and performance. For example, an application or service may be deployed on a distributed computing environment by allocating multiple elements of the distributed computing environment to handle its workload without substantial regard to how those elements are managed and/or maintained. Additionally, the distributed computing environment may provide a relatively high level of availability for the deployed application or service by automatically migrating the use of certain elements to other resources when those elements fail. Nevertheless, this flexible deployment of elements often causes an undue burden when those elements may be dispersed throughout the distributed computing environment and may change or be migrated to other locations on a relatively frequent basis. In such cases, a logical grouping of certain elements may be desired from which actions (e.g., configuration changes, allocation of new services, de-allocation of existing services, maintenance, etc.) may be performed. But currently available data store management systems that would otherwise provide this service are limited in their ability to effectively provide groupings of those elements from which efficient management may be performed.

Figure 1:
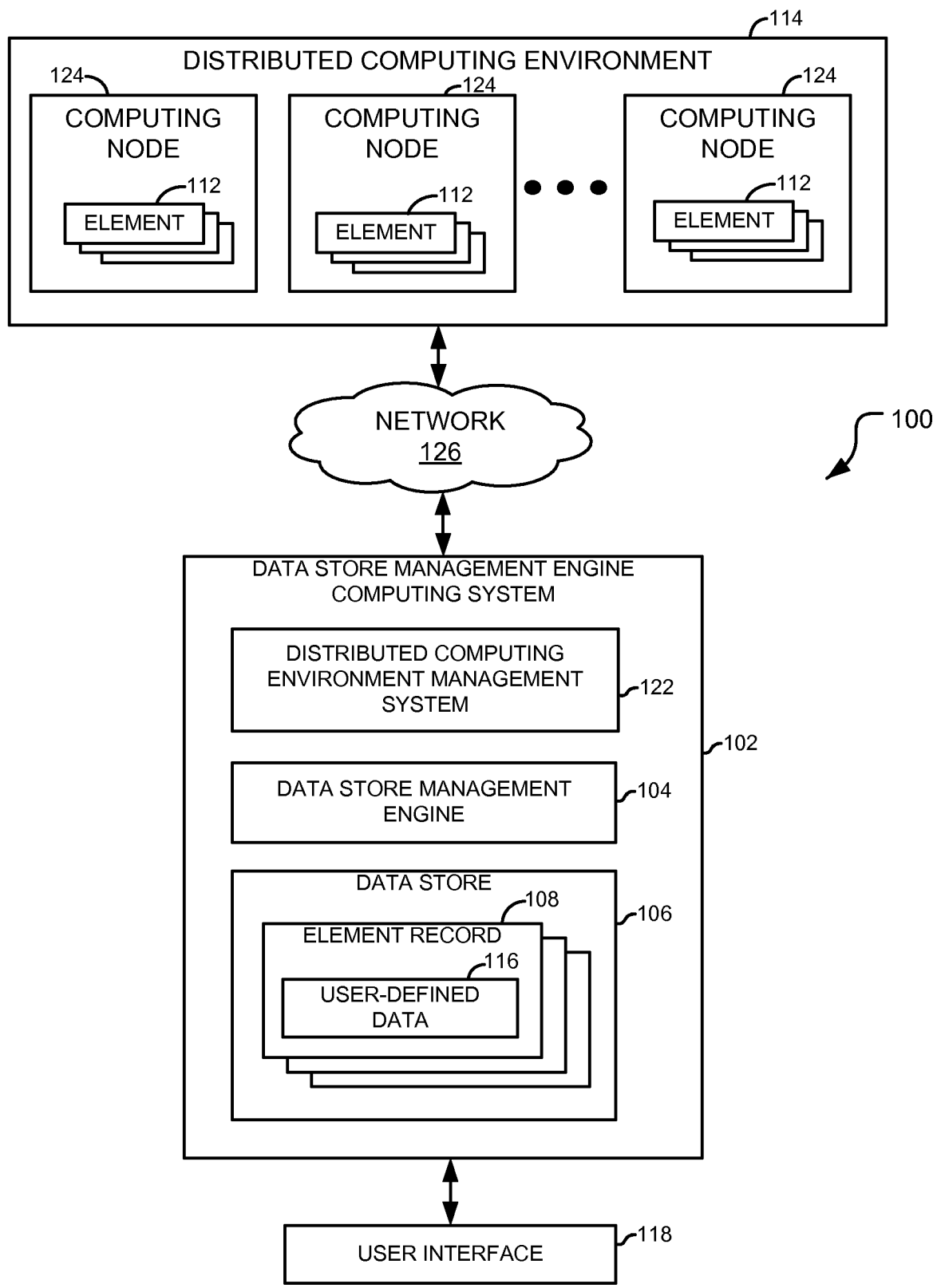
FIG. 1 illustrates an example distributed computing environment data store management system for a distributed computing environment according to one embodiment of the present disclosure.

FIG. 1 illustrates an example distributed computing environment data store management system 100 according to the teachings of the present disclosure. The system 100 includes a data store management engine computing system 102 having a data store management engine 104 and a data store 106 that stores element records 108 associated with the elements 112 of a distributed computing environment 114.

As will be described in detail herein below, the data store management engine 104 augments selected element records 108 with user-defined data 116 provided by a user via a user interface 118, and stores the augmented element records 108 in the data store 106 for use at a later time.

In general, the data store management engine 104 manages a data store 106 that includes element records 108 associated with the elements 112 in the distributed computing environment 114. The element records 108 are continually updated by the data store management engine 104, such as via the use of a discovery process performed at regular intervals, to maintain the element records 108 in an up-to-date state relative to the characteristics and operational conditions of the elements 112 that they represent. According to various embodiments of the present disclosure, the data store management engine 104 may also provide contextual search capabilities for certain element records 108, augment those element records 108 with user-defined data 116, and store the augmented element record 108 in the data store 106.

Embodiments of the present disclosure that augment the element records 108 associated with elements 112 of a distributed computing environment 114 may provide certain advantages not heretofore recognized by previous data store management systems for distributed computing environments 114. For example, the user-defined data 116, once coupled to its respective element record 108, becomes searchable such that ensuing search requests may be able to retrieve a defined grouping of element records 108 using a text string or other free-form text information included in the user-defined data 116, thus enabling a certain group of element records 108 to be obtained from among a relatively large number of element records 108 in a simple and efficient manner. Additionally, the user-defined data 116 may include additional information for users, such as administrators of the distributed computing environment 114, which may not be natively provided by existing information included in the element records 108. This free-form text information may be particularly useful for use with element records 108 that are associated with a relatively large number of elements 112 that may be dispersed throughout a distributed computing environment 114.

The user-defined data 116 may include any suitable type, such as free-form alpha-numeric text information (e.g., American Standard for Information Interchange (ASCII) characters), icons, photographs, vector graphics, video clips, and the like, that may be inputted into the user interface 118 by the user. Examples of such user-defined data 116 may include information associated with a special configuration that has been applied to a group of element records 108, particular constraints to be maintained for the group of element records 108, special warning notifications for the group of element records 108, general comments about each or a group of element records 108, and the like. In a particular example, a certain group of element records 108, which is slated to receive a software upgrade at a future time, may be augmented with user-defined data 116 to inform users who may access those element records 108 to utilize certain considerations when managing those elements 112 based upon the upcoming software upgrade. In one embodiment, the user defined data may include any data formatted according to the JSON format, which can potentially contain encoded images and other binary content, which may be hierarchically structured, such as similar to XML structured data or a series of key-value pairs where a value could in turn be another series of key-value pairs.

In one embodiment, the data store 106 comprises a NoSQL-type data store in which records, commonly referred to as documents, may be generated and stored therein without any specified schema. For example, the NoSQL-type data store may be administered by a NoSQL data store management engine that generates a document that is void of any particular schema typically associated with the records of a data store, and provides for access to each document using standard search notation, such as alpha-numeric search phrases and/or other criteria that may be used to access various forms of information about the documents stored in the data store. In a particular example, the NoSQL data store utilizes an Elasticsearch™ data store management engine, which is released under an open source license from the Apache Software Foundation in Forest Hill, Md.

The Elasticsearch™ data store management engine stores information about each element 112 as a Javascript object notation (JSON) document (e.g., an element record 108) in the data store 106 in a manner that does not require any particular schema. Thus, the schema of the newly added element record 108 does not need to be integrated with the schema of existing element records 108 in the data store 106. Additionally, the Elasticsearch™ data store management engine 104 is a multi-tenant data store management engine to effectively manage its use by multiple users, and has a RESTful interface for efficient operation across a network, such as a proprietary communication network of the distributed computing environment, or a publicly available network, such as the Internet.

The data store management engine 104 may communicate directly with the elements 112 in the distributed computing environment 114 to receive their information, or it may communicate with the elements 112 through an intermediary mechanism, such as a distributed computing environment management system 122. The distributed computing environment management system 122 may be any type, such as one that manages the operation of the elements 112 of the distributed computing environment 114, which may include, for example, provisioning elements, de-provisioning elements, configuring one or more operational parameters on each element 112, and the like. Any suitable type of distributed computing environment management system 122 may be implemented with the teachings of the present disclosure. In one embodiment, the distributed computing environment management system 1xx includes a vSphere™ software suite that is available from VMware Corporation, which is headquartered in Palo Alto, Calif.

The elements 112 may be provided by one or more computing nodes 124 configured in the distributed computing environment 114. In most cases, the elements 112 generally refer to computing devices that perform some function for the overall operation of the distributed computing environment 114, while the nodes 124 generally refer to physically distinct structures (e.g., computing racks) that house the elements 112. Examples of such computing devices may include, for example, laptop or notebook computers, workstations, personal digital assistants (PDAs), tablet computers, and the like, while the computing nodes 124 may include complex computing structures, such as clusters, unified computing systems, fabric-based computing systems, and dynamic infrastructures. The computing nodes 124 may also include other communication devices, such as switches, routers, firewall appliances, or other communication device that facilitates communication among multiple other computing nodes 124. Each computing node 124 may also include a distributed computing system, such as one implemented with one or more storage arrays, network element, compute devices, and/or any combination thereof. For example, a computing node 124 may comprise one or more converged infrastructures configured in the distributed computing environment 114.

The data store management engine computing system 102 and the distributed computing environment 114 communicate with one another using a communications network 126. Nevertheless, the data store management engine computing system 102 and the distributed computing environment 114 may communicate with one another in any suitable manner. For example, the data store management engine computing system 102 and the distributed computing environment 114 may communicate with each other using wireless and/or wired communications. In one embodiment, the data store management engine computing system 102 and the distributed computing environment 114 communicates with one another using a communication network 126, such as the Internet, an intranet, or another wired and/or wireless communication network. In another embodiment, the data store management engine computing system 102 and the distributed computing environment 114 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the data store management engine computing system 102 and the distributed computing environment 114 may communicate with one another without the use of a separate and a distinct network.

Figure 2A:
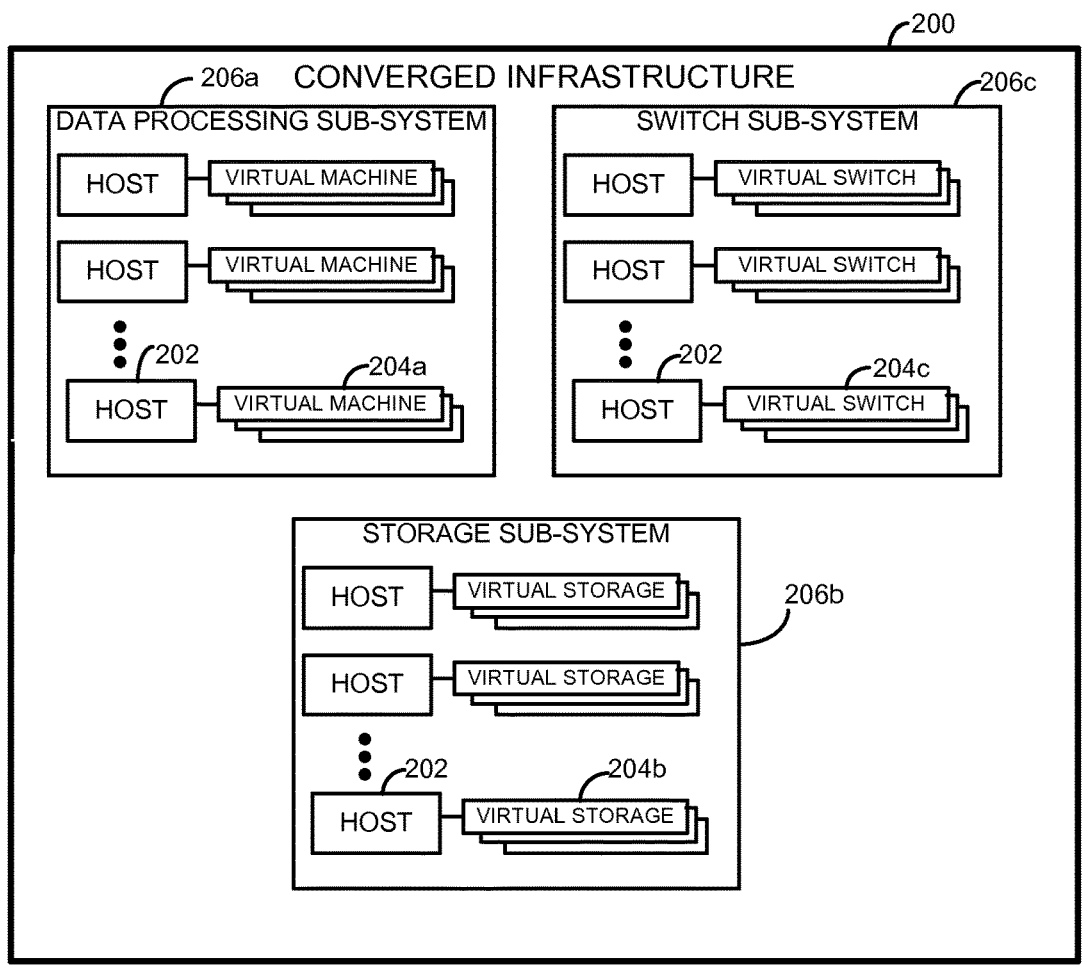
FIGS. 2A and 2B illustrate an example converged infrastructure that may be implemented as a computing node of the distributed computing environment according to one embodiment of the present disclosure.
Figure 2B:
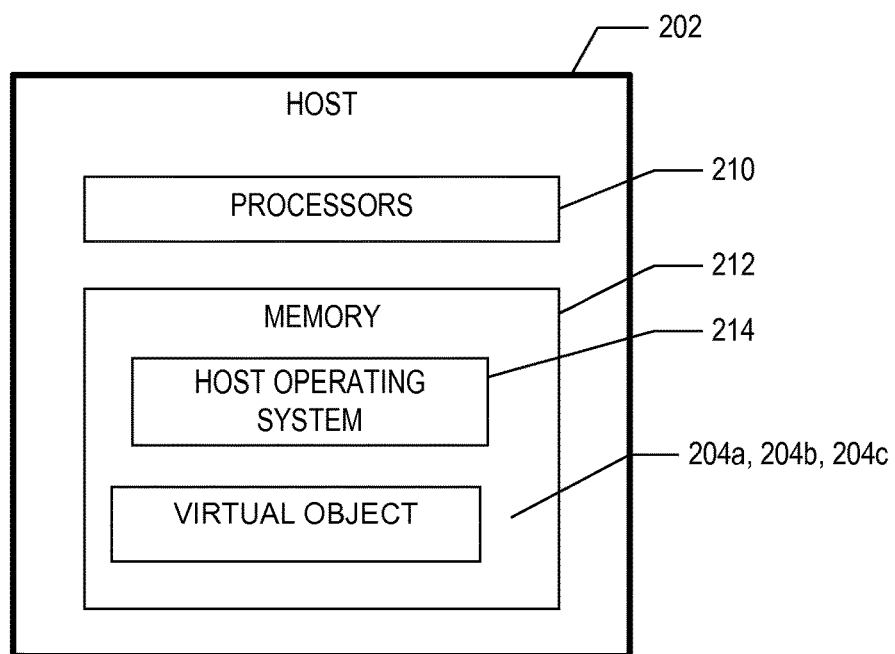

FIGS. 2A and 2B illustrate an example converged infrastructure 200 that may be implemented as a computing node 124 of the distributed computing environment 114 according to the teachings of the present disclosure. For example, multiple converged infrastructures 200 as described herein may be configured to communicate with one another using a communication network, such as the communication network 126 to form at least a portion of the distributed computing environment 114.

The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, in this disclosure, the term 'host' may be interpreted as any physical device and/or component that supports the operation of virtual elements 112 and services provided by those virtual elements. The particular converged infrastructure 200 as shown includes several sub-systems, such as a data processing sub-system 206a, a data storage sub-system 206b, and a switch sub-system 206c. Nevertheless, it should be understood that other converged infrastructures 200 may include additional, fewer, or different types of sub-systems without departing from the spirit and scope of the present disclosure.

In one aspect, each converged infrastructure 200 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that any converged infrastructure, such as a computer cluster, computing grid, blade array, and/or other converged infrastructure may be managed using the teachings of the present disclosure. For example, a converged infrastructure 200 such as that shown includes components found in Vblock™ System infrastructure packages available from VCE, LLC, which is located in Richardson, Tex.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) 202 that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMware ESX™ software suite that is available from VMware corporation, which is located in Palo Alto, Calif.

FIG. 2B illustrates an example host 202 implemented on each converged infrastructure 200 according to one aspect of the distributed computing environment data store management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

Figure 3:
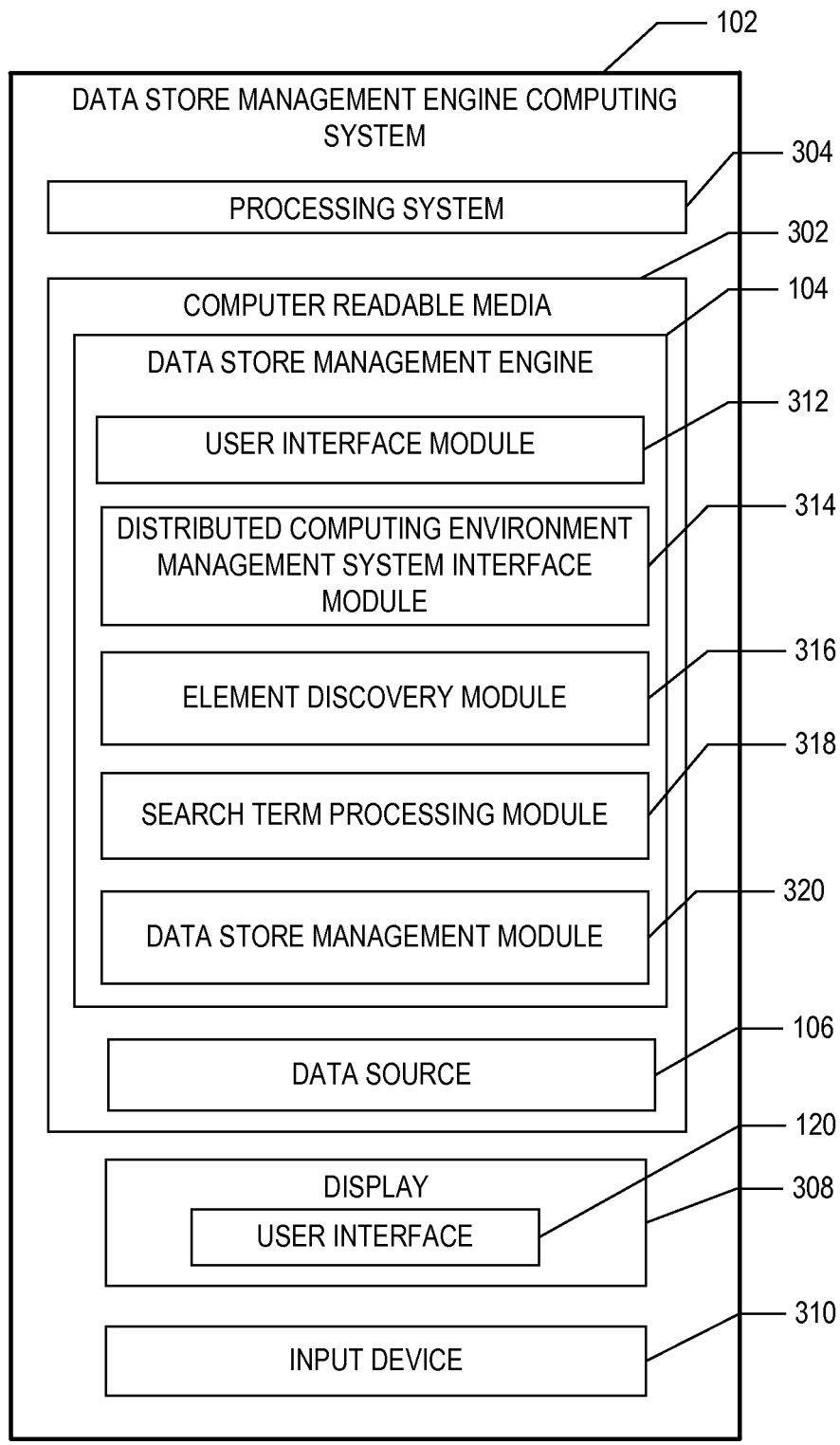
FIG. 3 illustrates a block diagram of an example data store management engine executed on the data store management engine computing system according to one embodiment of the present disclosure.

Referring now in more detail to FIG. 3, a block diagram of an example data store management engine 104 executed on the data store management engine computing system 102, is depicted according to one aspect of the present disclosure. The data store management engine 104 is stored in a computer readable media 302 and executed on a processing system 304 of the computing system 102. The computing system 102 may include any type of computing system, such as one or more management computing systems, personal computers, mobile computers and/or other mobile devices, and other hosts.

According to one aspect, the data store management engine computing system 102 also provides the user interface 118, such as a graphical user interface (GUI) or a command line interface (CLI), which may be displayed on a display 308, such as a computer monitor, for displaying data. The data store management engine computing system 102 also includes an input device 310, such as a keyboard or a pointing device (e.g., a mouse, trackball, pen, or touch screen) to enter data into or interact with the user interface 118. According to one aspect, the data store management engine 104 includes instructions or modules that are executable by the processing system 304 as will be described in detail herein below.

The computer readable media 302 includes volatile media, nonvolatile media, removable media, non-removable media, and/or another available medium. By way of example and not limitation, non-transitory computer readable medium comprises computer storage media, such as non-transient storage memory, volatile media, nonvolatile media, removable media, and/or non-removable media implemented in a method or technology for storage of information, such as computer readable instructions, data structures, program modules, or other data.

Figure 4A:
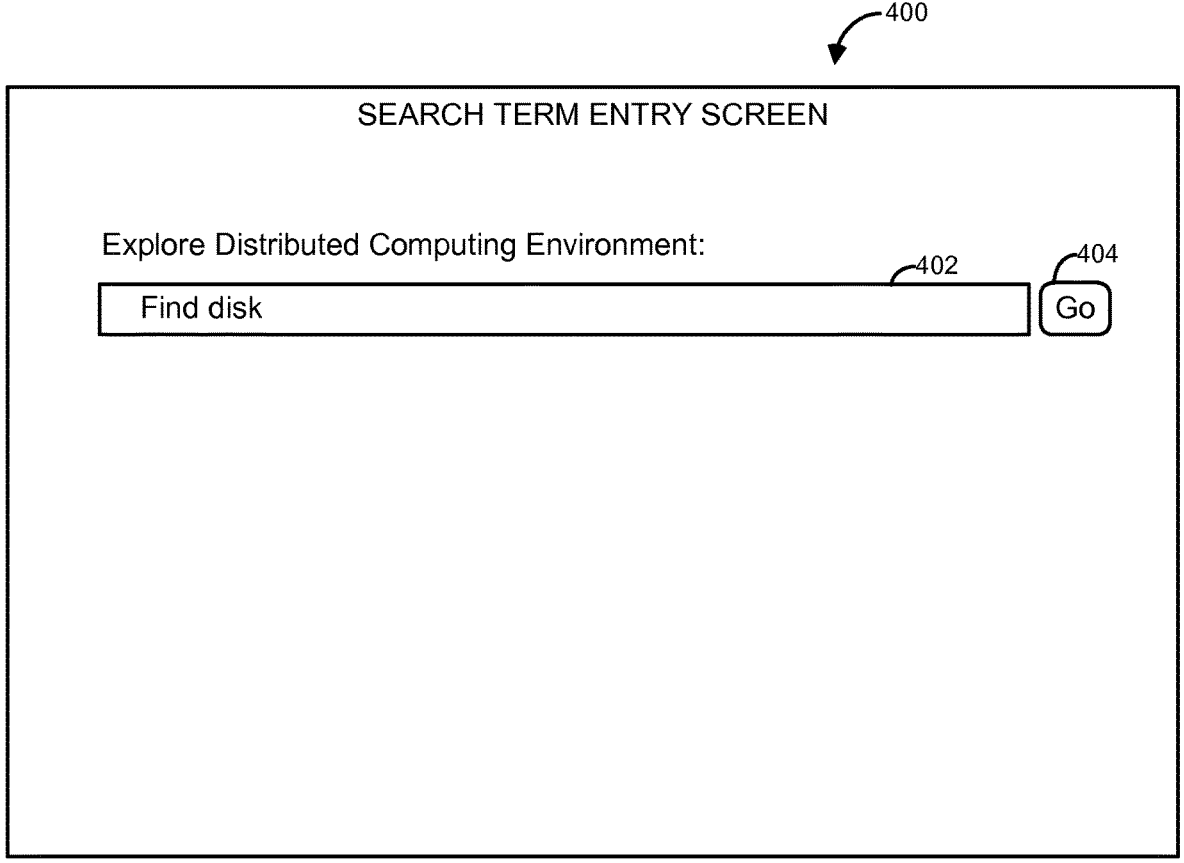
FIGS. 4A through 4D illustrate example screenshots that may be displayed by the data store management engine for augmenting element records associated with the elements of a distributed computing environment to include user-defined data according to one embodiment of the present disclosure
Figure 4B:
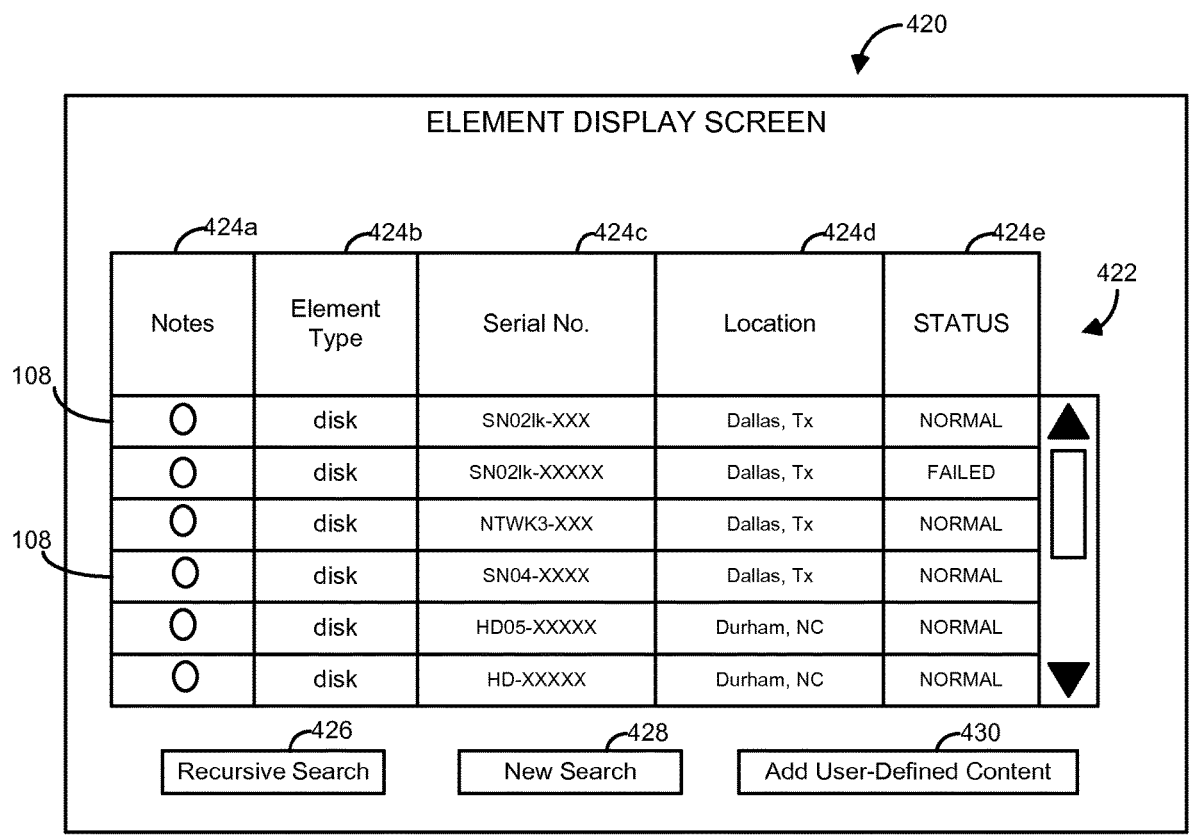
Figure 4C:
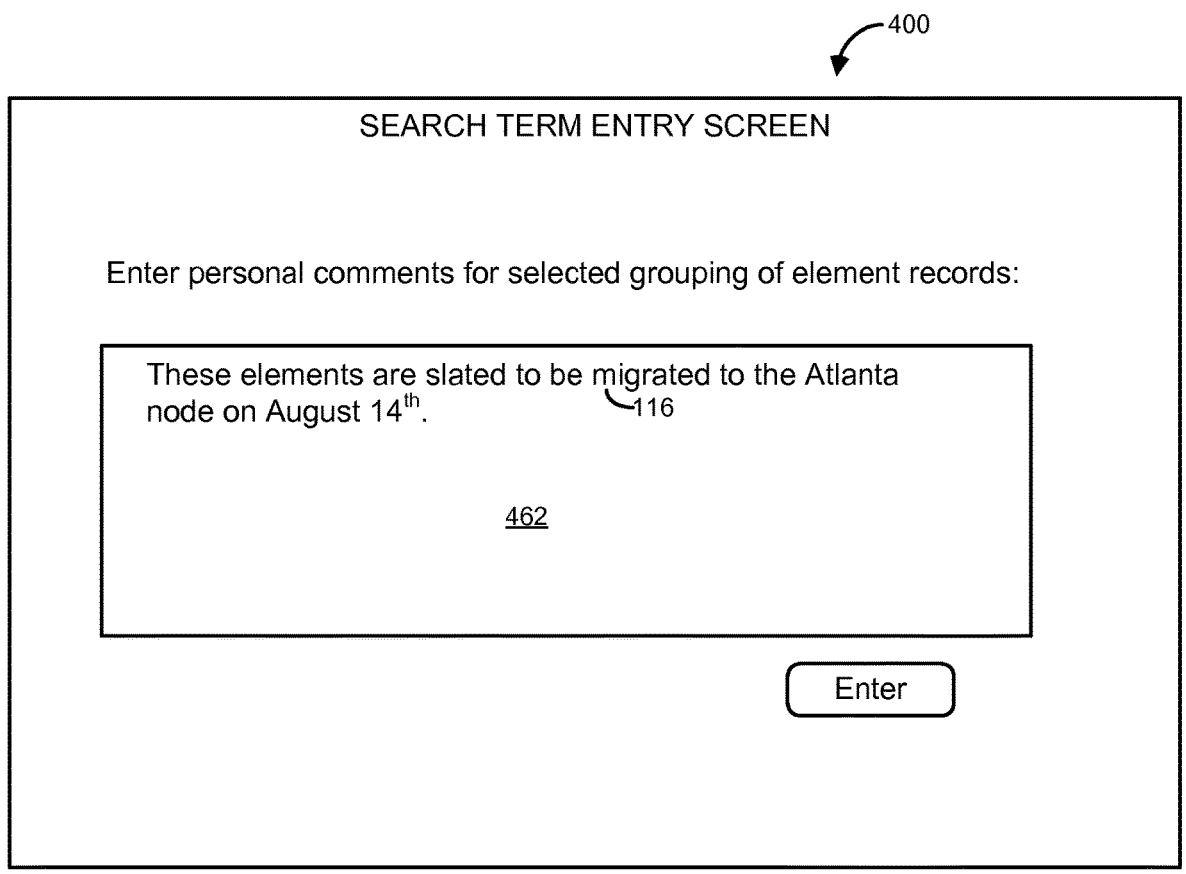
Figure 4D:
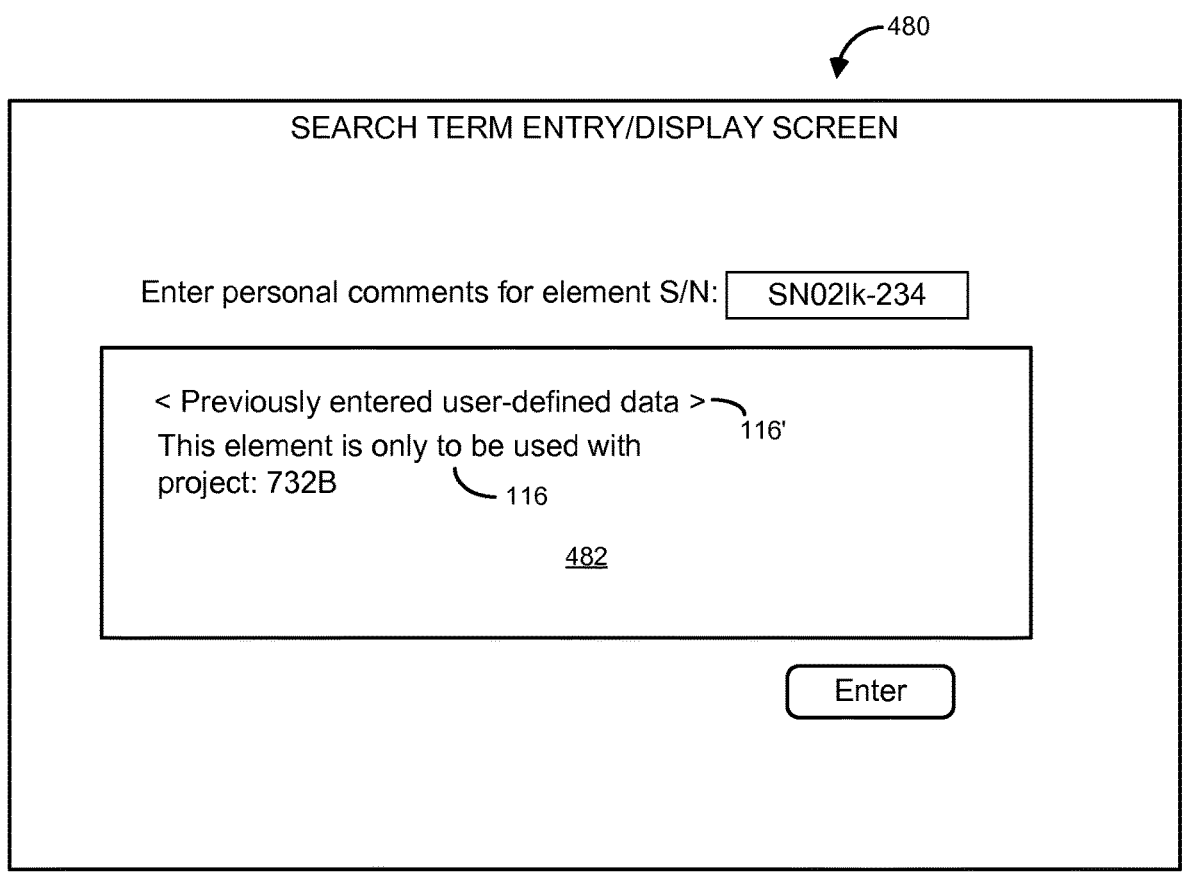

A user interface module 312 generates the user interface 118 to facilitate receipt of input data and/or output data from or to a user. The user interface module 312 may display information to, and receive user information, such as the user-defined data 116, from the user in any suitable form, such as via a graphical user interface (GUI) or a command line interface (CLI). In one embodiment, the user interface module 312 may display an entry field for receiving a search term or user-defined data 116 from the user as shown in FIGS. 4A and 4C, respectively, one or more element records 108 matching the search term as shown in FIG. 4B, and/or the user-defined data 116 previously entered by the user as shown in FIG. 4D. Nevertheless, other embodiments contemplate that the user interface module 312 may display any type and number of input fields for receiving user input and displaying responses to the user input. For example, the user interface module 312 may display multiple entry fields to receive multiple search terms from the user along with one or more other entry fields for receiving user input on how the fields are to be combined, such as using one or more Boolean operators.

A distributed computing environment management system interface module 314 provides an interface to the distributed computing environment management system 122 for transmitting and receiving information about the distributed computing environment 114, and/or other information associated with operation of the system. For example, the distributed computing environment management system interface module 314 may communicate with the distributed computing environment management system 122 to receive information about each element 112 in the distributed computing environment 114 to be used for generating the element records 108 that are stored in the data store 106. The information may include identification information that may be used to query the element directly to receive parametric information that is stored in the element records, or alternatively; the information may include some, most, or all parametric information that is used to store in the element record.

An element discovery module 316 performs a discovery process to obtain information associated with each element 112 in the distributed computing environment 114 and store the obtained element information element records 108 in the data store 106. For example, the element discovery module 314 may communicate with one or more element managers configured on each computing node 124 to obtain the element information. Examples of element managers that may be implemented with embodiments of the present disclosure include a Cisco Unified Computing System (UCS) manager provided by Cisco Systems, Inc., of San Jose, Calif., and a VMware Virtual Center provided by VMware Corporation, of Palo Alto, Calif. For another example, the element discovery module 314 may communicate directly with each element 112, such as by issuing broadcast messages requesting that each element 112 respond with identifying information indicating their presence, type, and/or any related parametric information.

In one embodiment, the element discovery module 314 may perform the discovery process on an ongoing, periodic basis so that the element records 108 may be maintained in a relatively well-managed, up-to-date condition. For example, the element discovery module 314 may poll one or more element managers to determine whether any elements 112 have been added, deleted, and/or modified, and if so, perform a discovery process with those elements 112 to update their information in the element records 108. As another example, the element managers may be configured to automatically notify the element discovery module 314 whenever an element 112 is added, deleted, and/or modified such that the element discovery module 314 is triggered to perform a discovery process on those elements 112.

An element search processing module 318 performs searches for certain element records 108 using one or more search criteria obtained from the user interface module 312. For example, upon receipt of one or more search terms from the user interface module 312, the element search processing module 318 may query the data store 106 to obtain those element records 108 that include data matching the search terms. Thereafter, the element search processing module 318 may communicate with the user interface 118 to display matched element records 108 on the user interface 118. In one embodiment, the element search processing module 318 communicates with a commercial-off-the-shelf (COTS) data store management engine to query the data store 106, and receive response to those queries. In other embodiments, the search term processing module 318 may communicate directly with the data store 106 to manage the element records 108 and/or receive element records 108.

A data store management module 320 manages various functions of the data store 106, such as formatting information about each element to generate the element records 108 that are stored in the data store 106, updating information in each element record 108, deleting obsolete element records 108, and the like. In one embodiment, the data store management module 320 includes an ElasticSearch™ data store management engine that creates and manages element records 108 using a schema-free JSON format, and has a RESTful interface for communication over a network. Nevertheless, the data store management module 320 may utilize any suitable type of data store management engine without departing from the spirit and scope of the present disclosure.

In one embodiment, the data store management module 320 augments element records 108 with user-defined data 116. For example, the data store management module 320 communicates with the user interface module 312 to receive an instance of user-defined data 116, structures the user-defined data 116 according to a specified format (e.g., a JSON document structure), and expands a selected element record 108 to include the formatted user-defined data 116.

Herein below is shown an example of the a single-result document structure that may be received by the element discovery module 316 upon initial discovery:

```
{
    "results": [
        {
            "elementType": "Port",
            "attributes": {
                "status": "up",
                "configured": "false",
                "Host": "atlanta.lcd.east",
                "lastStatusChange": "2015-07-06T18:20:07.595Z",
                "name": "Port-5",
                "uid": "192,168.1.139"
            },
            "attachments": { }
        }
    ]
}
```

Then the data store management module 320 may receive user input with user-defined data 116 to generate an example structure along with a timestamp, such as:

```
{
"comment": {
    "timestamp": "2015-07-06T20:15:00.000Z",
    "body": "These elements are slated to be migrated . . .
"
}
}
```

And the resulting, combined, searchable document content would be:

```
{
    "results": [
        {
            "elementType": "Port",
            "attributes": {
                "status": "up",
                "configured": "false",
                "ost": "atlanta.lcd.east",
                "lastStatusChange": "2015-07-06T18:20:07.595Z",
                "name": "Port-5",
                "uid": "192.168.1.139"
            },
            "attachments": {
                "comment": {
                    "timestamp": "2015-07-06T20:15:00.000Z",
                    "body": "These elements are slated to be migrated..."
                }
            }
        }
    ]
}
```

It should be appreciated that the modules described herein are provided only as examples, and that the data store management engine 104 may have different modules, additional modules, or fewer modules than those described herein. For example, one or more modules as described in FIG. 3 may be combined into a single module. As another example, certain modules described herein may be encoded on, and executed on other computing devices, such as on one of the hosts 202 of a converged infrastructure 200 as described above with reference to FIGS. 2A and 2B.

FIGS. 4A through 4D illustrate example screenshots that may be displayed by the data store management engine 104 for augmenting element records 108 associated with the elements 112 of a distributed computing environment 114 to include user-defined data 116 according to one embodiment of the present disclosure. In general, FIG. 4A is a search term entry screen 400 that may be used for receiving one or more search terms from the user, FIG. 4B is an element display screen 420 for displaying information about the element records 108 that match the search terms entered in the search term entry screen 400 of FIG. 4A, FIG. 4C is a user-defined data entry screen that receives user-defined data 116 from the user for the group of element records 108 displayed in FIG. 2B, and FIG. 4D is a user-defined data entry/display screen 480 that may be used to enter and/or display the user-defined data 116 for individual element records 108.

Referring initially to FIG. 4A, the search term entry screen 400 includes an entry field 402 for entering one or more search terms, and a 'go' button 404 for submitting the entered search terms to the data store management engine 104. The entry field 402 supports entry of a single search term or the entry of multiple search terms that may be separated by one or more Boolean operators, such as 'AND', 'OR', 'ANDNOT', 'ORNOT', and the like. Additionally the entry field 402 supports entry of a phrase including a structured sequence of multiple words, such as "compute array devices, "Atlanta, Ga.", "ACME, Incorporated", and the like. Once the search term(s) have been entered, the 'go' button 404 may be selected for submitting the search term(s) to the data store management engine 104.

Once the search term(s) have been submitted, the element display screen 420 (FIG. 4B) may be displayed that includes those element records 108 matching according to the terms inputted in the search term entry screen 400 by the engine 104. The element display screen 420 includes an element record list 422 in which the element records 108 are arranged in rows and various parameters associated with each element record 108 are arranged in columns. The element record list 422 includes a 'Notes' column 424a, an 'element type' column 424b, a 'serial number' column 424c, a 'location' column 424d, and a 'status' column 424e. The 'element type' column 424b indicates the element type of its respective element record 108. The 'serial number' column 424c indicates a serial number associated with each element record 108 and is essentially a unique identifier associated with its respective element record 108. The 'location' column 424d indicates the location that the element associated with the element record 108 is located at, while the 'status' column 424e indicates whether its respective element 112 is in an normal or failed state. Although the example element record list 422 shown herein has an 'element type' column 424b, a 'serial number' column 424c, a 'location' column 424d, and a 'status' column 424e, other example element record lists may include additional, fewer, or different types of parameters than shown above.

The element display screen 420 includes a 'recursive search' button 426 that when selected by the user, causes the data store management engine 104 to again display the search term entry screen 400 for receiving one or more additional search terms from the user. Use of the 'recursive search' button 428 may be useful for cases in which the user desires to further filter the element records 108 to obtain a relatively more concise grouping of certain element records 108. For example, the user may wish to obtain a certain type of element records 108 for all disks at one particular location. However, an initial search for the desired type of element records 108 (e.g., disks) shows the disk element records 108 to all disks regardless of location. Therefore, the user may select the 'recursive search' button 426 to enter another search term including the desired location (e.g., Dallas, Tex.) such that another search may be performed such that only the disk element records 108 associated with disk elements located at Dallas, Tex. are retrieved and displayed.

The element display screen 420 also includes a 'new search' button 428 that when selected by user, causes the engine 104 to again display the search term entry screen 400 for receiving entry of other search terms from the user. The engine 104 performs actions in response to the 'new search' button 428 that are different from those performed in response to the 'recursive search' button 426. Whereas, selection of the 'recursive search' button 426 causes the engine 104 to cumulatively add filtering provided by a previous entry of search terms, the engine 104 cancels the search terms obtained via any previous entry in response to the 'new search' button 428. By use of the 'new search' button 428, the user may be able to initiate a new search for other element records 108 when a previous search for a previous group of element records 108 has been completed.

The element display screen 420 also includes an 'add user-defined content' button 430 that when selected by the user, causes the data store management engine 104 to display the user-defined data entry screen 460 as shown in FIG. 4C. The user-defined data entry screen 460 includes an entry field 462 for entry of user-defined data 116 to be associated with each element record 108 displayed in the element display screen 420. Examples of user-defined data that may be entered and processed by the data store management engine 104 includes alpha-numeric text, icons, and/or graphical imagery such as photographs, vector images, video clips, and the like.

Nevertheless, if the user desires to enter user-defined data for only one element record 108 displayed in the element display screen 420, the 'note' column 424*a* of the element record list 422 may be used. For example, the user-defined data entered in this context may include any free form text information to be associated with a single element. The 'note' column 424*a* includes radio buttons for each element record 108 such that, when selected by the user, causes the data store management engine 104 to generate an user-defined data entry/display screen 480 to be displayed as shown in FIG. 4D. In general, the user-defined data entry/display screen 480 provides for entry of user-defined data from the user and/or display of previously entered user-defined data for a single element record 108 displayed in the element record list 422. To this end, the user-defined data entry/display screen 480 includes an entry field 482 for entry of user-defined data 116 to be associated with each element record 108 displayed in the element display screen 420. Additionally, the engine 104 may display any previously entered user-defined data 116' associated with that particular element record 108.

When user-defined data is entered through either the user-defined entry screen 460 of FIG. 4C, or the user-defined entry/display screen 480 of FIG. 4D, it may be cumulatively added to any existing user-defined data 116 previously entered for its respective element record 108. For example, a user, who may desire to enter a message for other users about a certain constraint to a used for a particular group of elements, may use the user-defined entry screen 460 such that the message is added to all element records 108 of that group. Additionally, the user, who may desire to add an additional message to one of the element records 108 in that group, may select the radio button in the 'note' column 424*a* to add an additional message to only that element record 108 associated with the selected radio button.

In one embodiment, for graphical imagery entered through the user-defined entry screen 460 of FIG. 4C, or the user-defined entry/display screen 480 of FIG. 4D having a relatively high degree of detail, the data store management engine 104 may display an icon having a reduced level of detail (e.g., a thumbnail) in the display portion 462 or 482, respectively, and expand the graphical image to its full form when selected by the user. For example, the user may enter a photograph showing a repair procedure that has recently been performed on a particular element 112 associated with the element record 108. Thereafter, when displayed in the user-defined entry/display screen 480, a relatively small, downsized image may be initially displayed, and when selected by the user, its corresponding original photograph may be displayed for view by the user.

Although FIGS. 4A through 4D illustrate example screens that may be used for receiving user input for augmenting the element records 108 associated with a distributed computing environment 114 with user-defined content, the data store management engine 104 may display additional, fewer, or different entry screens without departing from the spirit and scope of the present disclosure. For example, the data store management engine 104 may display other screens for entering and/or displaying the element records 108 and their associated user-defined data 116 in any suitable manner. For example, the user-defined content may be programmatically generated and/or converted from some other structured content, such as XML, HTML, word processing, spreadsheet formatted content.

Figure 5:
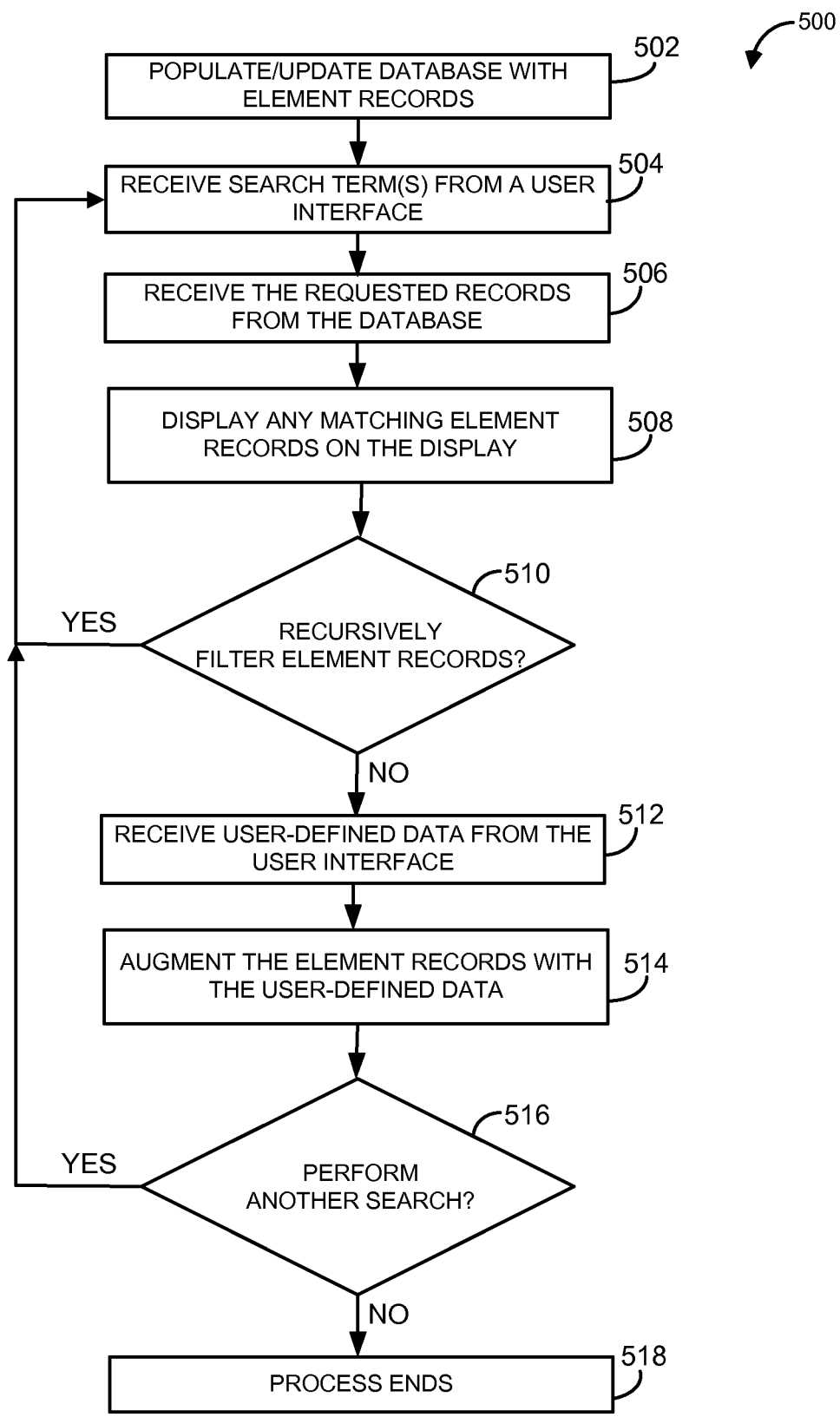
FIG. 5 illustrates an example process that is performed by the data store management system according to one embodiment of the present disclosure.

FIG. 5 illustrates an example process 500 that is performed by the data store management engine 104 for receiving input from a user interface for augmenting one or more element records 1*xx* of a distributed computing environment 114 with user-defined data 116 according to one embodiment of the present disclosure.

In step 502, the data store management engine 104 populates and/or updates the data store 106 with element records 108 associated with the elements 112 of a distributed computing environment 114. For example, the data store management engine 104 may populate a new data store that has not previously been populated with the element records 108, or if the data store has been previously populated, the data store management engine 104 may update an existing data store with the element records 108 on an ongoing (e.g., periodic) basis such that the parameters and their respective reflect the most recent status of each element 112 of the distributed computing environment 114.

In one embodiment, the data store management engine 104 communicates directly with each element 112 to receive its parametric values. In another embodiment, the data store management engine 104 communicates indirectly with each element 112 using an element manager associated with each element 112 to obtain its parametric values.

In step 504, the data store management engine 104 receives one or more search terms from the user interface 118. If more than one search term are received, it may apply one or more Boolean operators (e.g., OR, AND, ANDNOT, ORNOT, etc.) between each search term.

In step 506, the data store management engine 104 searches the data store 106 for any element records 108 that match the one or more search terms. In one embodiment, the search terms may be applied against any previously entered user-defined data 116 assigned to any of the element records 108 in the data store 106. That is, the engine 104 compares any entered search terms with the user-defined data 116 stored in the element records 108 and obtains those records that match the search terms. Thereafter, the data store management engine 104 displays the matched element records 108 on the user interface 118 in step 508.

In step 510, the data store management engine 104 determines whether the currently obtained element records 108 are to be further filtered using one or more additional search terms. For example, the data store management engine 104 may receive user input via the 'recursive search' button 428 on the query response screen 420 that instructs the data store management engine 104 to receive one or more additional search term(s). If the data store management engine 104 receives instructions to recursively filter the identified element records 108, processing continues at step 502 to receive additional search terms from the user. However, if the data store management engine 104 determines that no recursive filtering of the obtained element records 108 are to be provided, processing continues at step 512.

In step 512, the data store management engine 104 receives user-defined data 116 to be added to one or more of the element records 108 displayed in step 508. Thereafter in step 514, the user-defined data 116 may be added to one or more of the element records 108 that have been displayed in step 508. In one example, the user-defined data 116 may be added to all of the element records 108 displayed in step 508 such as shown and described above with respect to FIG. 4C. In another example, user user-defined data 116 may be added to an individual element record 108 as shown and described above with respect to FIG. 4D.

In step 516, the data store management engine 104 determines whether another search is to be performed. For example, the data store management engine 104 may receive user input via the 'new search' button 428 on the element display screen 420 that instructs the data store management engine 104 to clear its search term buffer for constructing a new group of element records 108. If the data store management engine 104 receives instructions to perform another search, processing continues at step 502 to receive new search terms from the user. However, if the data store management engine 104 determines that no additional searches are to be performed, processing continues at step 518 in which the process ends.

Although FIG. 5 describes one example of a process that may be performed by the system for augmenting element records 108 with user-defined data 116, the features of the disclosed process may be embodied in other specific forms without deviating from the spirit and scope of the present disclosure. For example, the system 100 may perform additional, fewer, or different operations than those operations as described in the present example. As another example, the steps of the process described herein may be performed by a computing system other than the computing system 102, which may be, for example, one of the virtual objects executed on the virtual computing environment.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
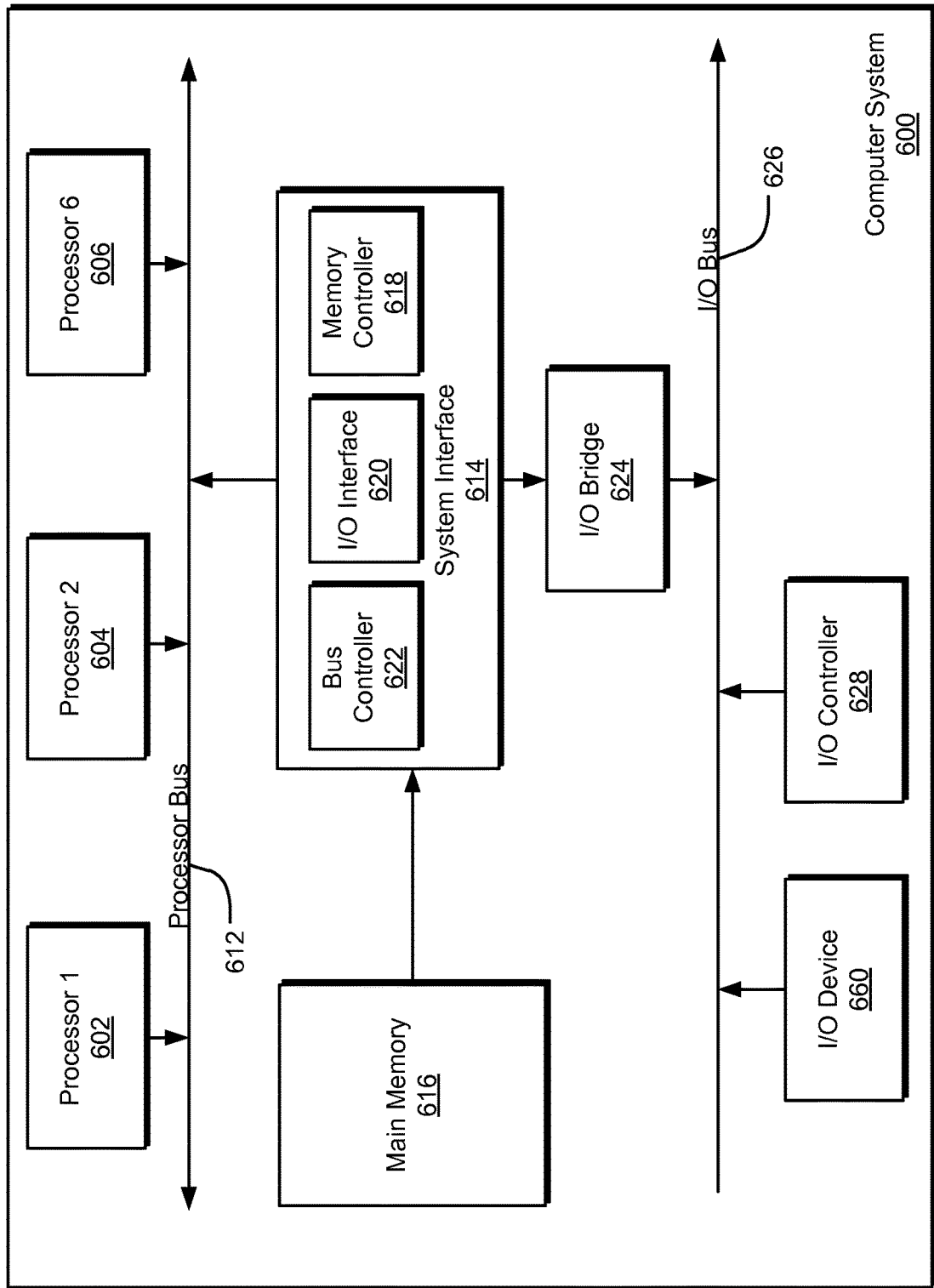
FIG. 6 illustrates an example computer system according to one embodiment of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for making searchable updates to records in a data store, the method comprising:
    performing, by a processor, a discovery process, the discovery process updating element records with one of presence, type, or parametric information, the element records associated with respective components of a distributed computing environment and including specification information of the respective components, the specification information comprising one or more of notes, an element type, a serial number, a location, or a status;
    receiving, by the processor, at least one of a user-defined data from a user interface, the user-defined data comprising free-form text information and at least one graphical image comprising a digital photograph of an element of the distributed computing environment;
    retrieving, based on the user-defined data, a subset of the element records of the element records;
    adding, in response to an input received from the user interface and to each element record of the subset of the element records, the graphical image and a searchable structure comprising the user-defined data, the graphical image and the searchable structure included within an attachments portion of each element record of the subset of the element records; and
    retrieving, by the processor in response to a query, the subset of element records, the query comprising at least a portion of the user-defined data or the one or more search terms and identifying the subset of element records by the added searchable structure.

2. The method of claim 1, further comprising conducting a recursive search in which another search is conducted using one or more additional search terms.

3. The method of claim 1, wherein the user-defined data further comprises at least one of an icon, a vector image, or a video clip.

4. The method of claim 1, further comprising issuing a request to a database search engine that maintains the element records without any specified schema in the data store.

5. The method of claim 1, further comprising performing an initial discovery process to populate the data store with the element records associated with the components of the distributed computing environment.

6. A system for making searchable modifications to data in a data store, the system comprising:
    a computing system in communication with a distributed computing environment comprising a plurality of elements and a database that stores element records, the element records associated with respective components of the distributed computing environment and including specification information automatically retrieved from the respective components, the specification information comprising one or more of notes, an element type, a serial number, a location, or a status, the computing system comprising a hardware processor and a memory to store instructions that are configured to, when executed by the hardware processor, to execute instructions comprising:
    perform a discovery process, the discovery process updating the element records with one of presence, type, or parametric information;
    receive at least one of user-defined data from a user interface, the user-defined data comprising free-form text information and a at least one graphical image comprising a digital photograph of an element of the distributed computing environment;
    retrieve, based on the user-defined data, a subset of the element records of the element records;
    add, in response to an input received from the user interface and to each element record of the subset of the element records, the graphical image and a searchable structure comprising the user-defined data, the graphical image and the searchable structure included within an attachments portion of each element record of the subset of the element records; and retrieve the subset of element records in response to a user query comprising at least a portion of the user-defined data or the one or more search terms and identifying the subset of element records by the added searchable structure.

7. The system of claim 6, wherein the instructions further comprise conduct a recursive search in which another search is conducted using one or more additional search terms.

8. The system of claim 6, wherein the user-defined data further comprises at least one of an icon, a vector image, or a video clip.

9. The system of claim 6, wherein the instructions further comprise issue a request to a database search engine that maintains the element records without any specified schema in the data store.

10. The system of claim 9, wherein the element records are stored in the data store as Javascript object notation (JSON) documents.

11. The system of claim 6, wherein the instructions further comprise perform an initial discovery process to populate the database with the element records associated with the elements of the distributed computing environment.

12. A non-transitory computer readable medium storing instructions which, when executed by a computer configured to make searchable modifications to data in a data store, cause the computer to perform operations comprising:
performing an element discovery process, the element discovery process updating element records with one of presence, type, or parametric information, the element records associated with respective components of a distributed computing environment and including specification information of the respective components, the specification information comprising one or more of notes, an element type, a serial number, a location, or a status;
receiving at least one of user-defined data from a user interface, the user-defined data comprising free-form text information and a at least one graphical image comprising a digital photograph of an element of the distributed computing environment;
retrieving, based on the user-defined data, a subset of the element records of the element records;
adding, in response to an input received from the user interface and to each element record of the subset of the element records, the graphical image and a searchable structure comprising the user-defined data, the graphical image and the searchable structure included within an attachments portion of each element record of the subset of the element records; and
retrieving the subset of element records in response to a user query comprising at least a portion of the user-defined data or the one or more search terms and identifying the subset of element records by the added searchable structure.

13. The non-transitory computer readable medium of claim 12, storing additional instructions which, when executed by the computer, cause the computer to perform additional operations comprising conducting a recursive search in which another search is conducted using one or more additional search terms.

14. The non-transitory computer readable medium of claim 12, storing additional instructions which, when executed by the computer, cause the computer to perform additional operations comprising performing an initial discovery process to populate the data store with the element records associated with the elements of the distributed computing environment.

* * * * *